May 16, 1933.  R. N. FALGE ET AL  1,909,526
REAR VIEW MIRROR HOLDER
Filed March 23, 1932  3 Sheets-Sheet 3
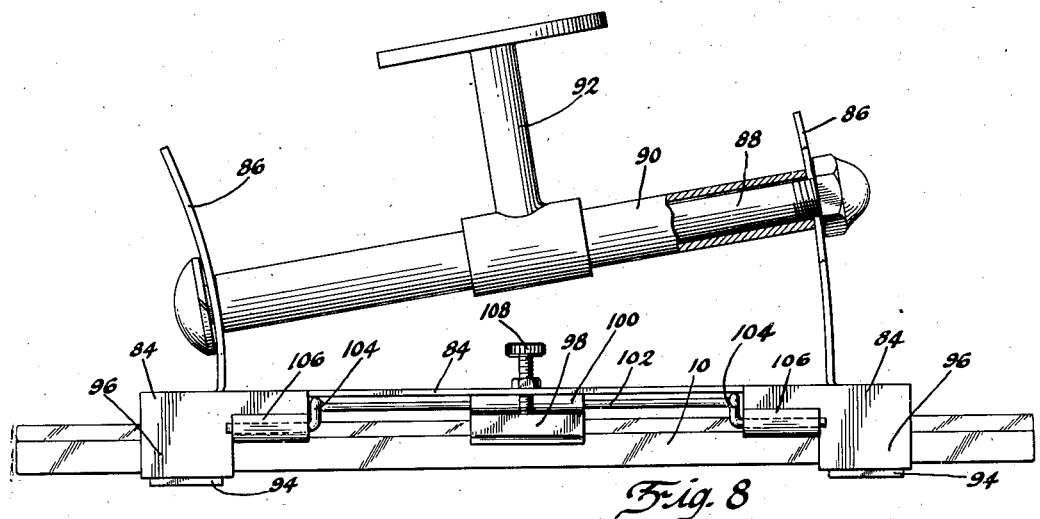
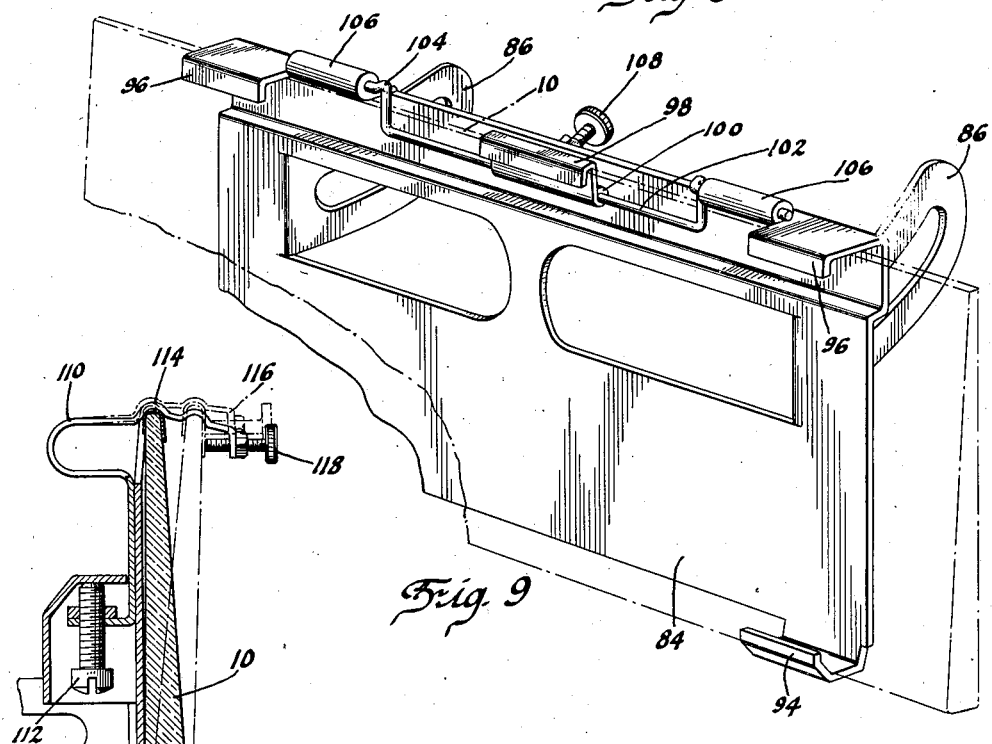
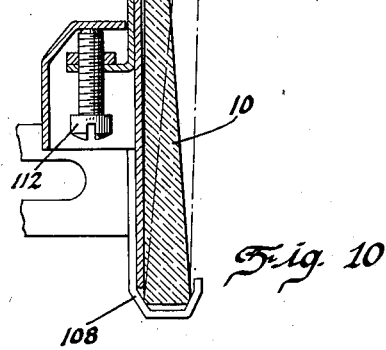
Inventors
Charles E. Godley &
Robert N. Falge
By Blackmore, Spencer & Flint
Attorneys Patented May 16, 1933

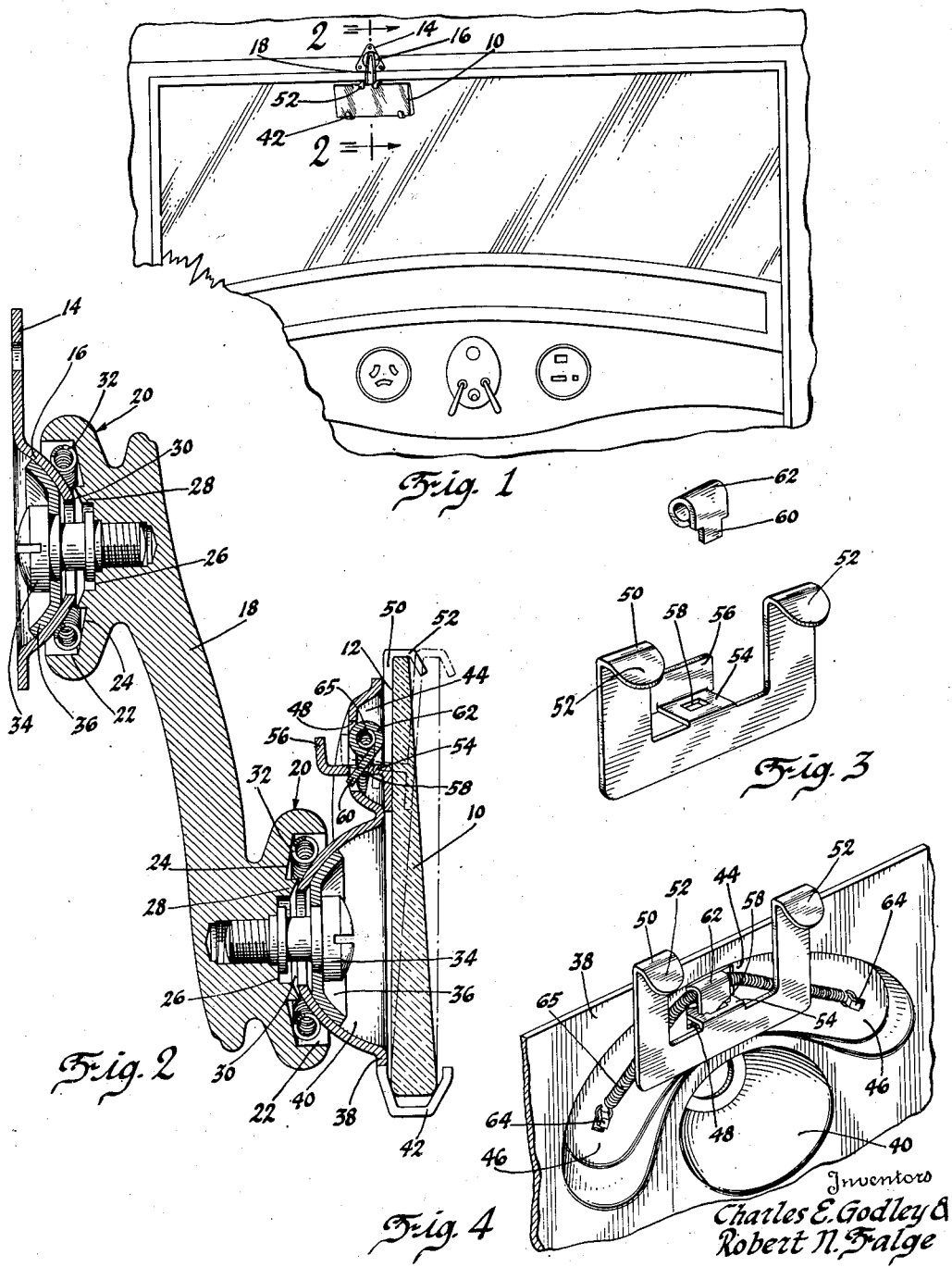

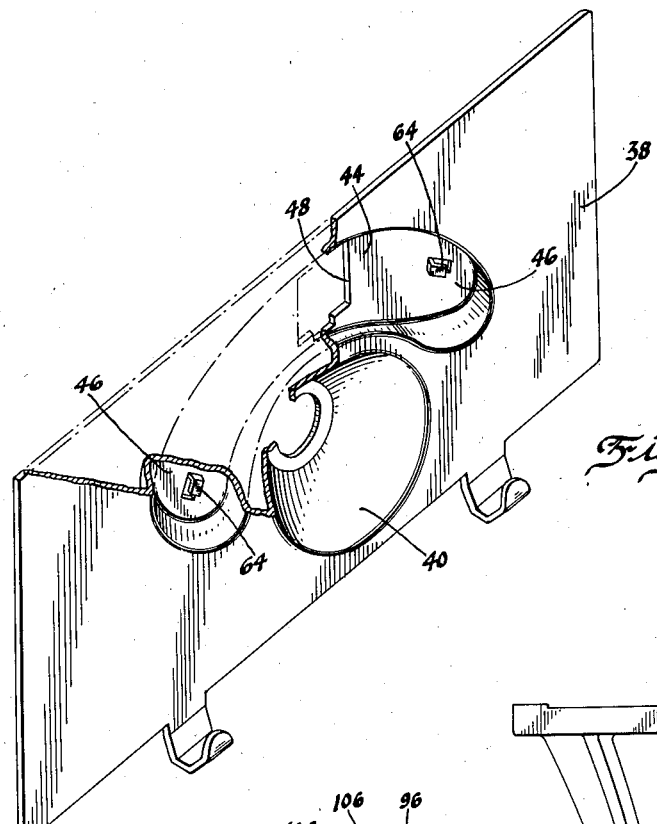
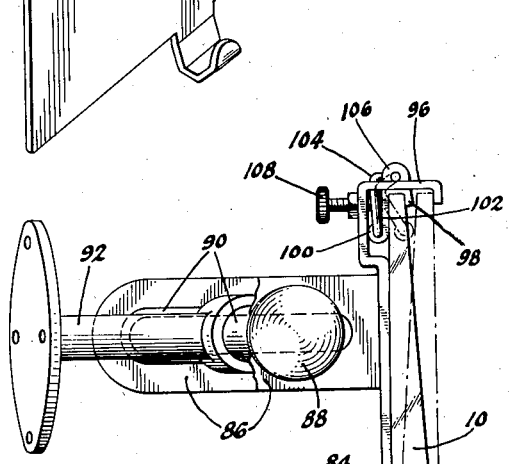
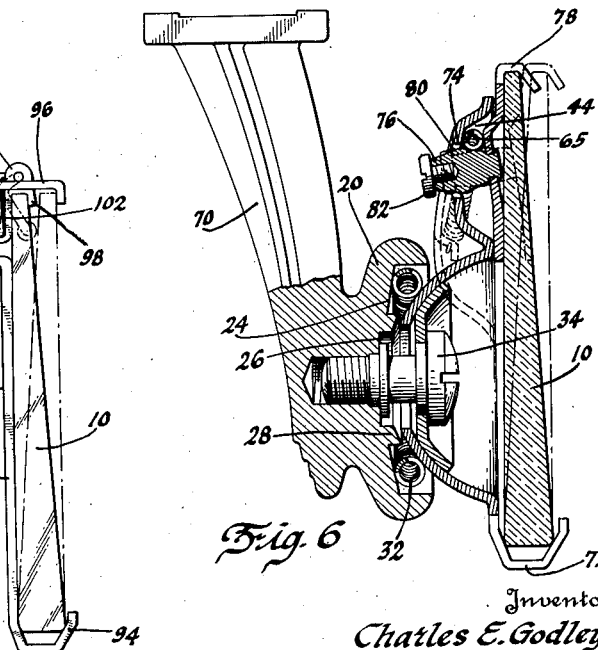

1,909,526

UNITED STATES PATENT OFFICE

ROBERT N. FALGE, OF BIRMINGHAM, AND CHARLES E. GODLEY, OF YPSILANTI, MICHIGAN

REAR VIEW MIRROR HOLDER

Application filed March 23, 1932. Serial No. 600,772.

This invention has to do with a mounting for rear vision mirrors, and while it has features that will be found useful with any type of mirror, it is particularly designed for mirrors having two reflecting surfaces arranged at an angle to each other so that by tilting the mirror one or the other of these surfaces may be brought into position for use. The two surfaces may either be the front and rear surfaces of a wedge-shaped piece of glass, or they may be surfaces formed on separate members arranged at any desired angle with respect to each other. One surface is a high efficiency reflecting surface, and the other surface is a low efficiency reflecting surface, especially suitable for night driving because it eliminates glare from the headlamps of following cars.

An important feature of the invention consists in so mounting the mirror that it may not only be tilted but that the mirror and the tiltable mounting may together be adjusted to any desired angular position. This last adjustment is necessary to accommodate persons of different height and seating position, and when the mirror is properly adjusted for a particular driver it may be tilted to present either reflecting surface as desired.

In our design we have embodied a number of novel features. Thus we have provided for yieldably holding the mirror in either of its tilted positions, and, if desired, this arrangement may be so designed that the same spring that accomplishes this result also helps hold the mirror in its bracket. Many other novel features will be pointed out in the course of the following description.

Figure 1 is a view of a portion of the interior of an automobile showing our improved mirror mounting.

Figure 2 is a section on line 2—2 of Figure 1.

Figure 3 is a perspective view of certain parts of the tiltable mirror mounting of Figure 2.

Figure 4 is a fragmentary view of a portion of the mirror bracket showing the same parts in assembled relation.

Figure 5 is a perspective view of the mirror bracket.

Figure 6 is a sectional view corresponding to Figure 2 showing a modification.

Figure 7 is an end view, partly broken away, showing a further modified form.

Figure 8 is a top plan view of the form shown in Figure 7.

Figure 9 is a perspective view of the mirror holding mechanism of Figure 7.

Figure 10 is a sectional view corresponding to Figure 2 showing a further modified form.

In the drawings we have shown a mirror 10 of wedge shape. The back of the mirror, indicated at 12, is silvered in the usual manner. The angle between the front and back faces of the mirror may be of any desired angle, preferably not more than a few degrees, just sufficient to separate the images from the front and back surfaces of the mirror by a sufficient amount so that they will not overlap. In day driving the mirror is adjusted so that the reflecting surface 12 gives a view of the road to the rear, and at night the mirror is adjusted so that the front surface of the glass acts as a mirror. As the efficiency of the latter is but around 5%, the reflections from glaring headlamps in the rear will be of such low intensity as not to cause glare. In the place of the wedge-shaped one-piece mirror illustrated, it is obvious that a two-piece mirror might be employed, one piece consisting of plain glass, and the other of highly polished metal, or glass silvered upon its back, the pieces being arranged in a suitable frame at an angle to each other so that reflecting surfaces of the two members will act in the same manner as the reflecting surfaces of the single member illustrated at 12. Such a construction is known in the prior art, being disclosed in the patent to Wetherbee, 1,808,740, granted June 2, 1931, and, since it is old, it is not illustrated herein.

In Figures 1 to 5, we have shown the preferred embodiment of our mounting. Here the part 14 may be regarded as the support. It is in the form of a plate bolted to the body above the windshield, and shaped to provide a spherical boss 16 to which is secured the link 18 supporting the mirror. Of course, in metal bodies it would be feasible to make the support 14 an integral part of a metal member of the body frame.

The link 18 is provided at each end with a cup-shaped enlargement 20 provided with an annular cavity 22 having an inclined bottom 24 of conical shape. The cup-shaped enlargements 20 are likewise provided with central recesses 26. The annular rib 28, separating the recess from the channel, is formed with a substantially spherical contour 30 to clear the boss 16 formed on the support 14. An annular helical spring 32 is received within the channel 22, and the coils are of such diameter as to have wedging engagement between the boss 16 and the surface 24. The wedging engagement is produced by tightening of bolt 34 which is threaded into the arm 18 and carries a collar 36, likewise of spherical contour.

It will be obvious that when the bolt 34 is tightened, the annular spring 32, 'normally of a smaller diameter,' will be expanded by the outer spherical surface of boss 16, thereby exerting a separating pressure between boss 16 and the inclined surface 24 and hold the parts in adjusted position. The frictional grip may be varied by changing the angle of the inclined surface 24, for the nearer surface 24 and the spherical surface of boss 16 are to being parallel, the tighter the holding power of the joint. The frictional grip may be overcome by applying pressure or power to the arm 18 and the joint will then permit limited movement in all directions as in the case of a conventional universal joint.

In the conventional universal joint the spherical shapes cannot be made accurately enough from sheet metal to permit of a smooth working adjustment. In the improved joint the annular spring contracting between the parts takes up all the irregularities or wear in the parts, permitting a smooth adjustment and one that is shake-proof due to the contracting effect of the coils of member 32 between the inclined surface 24 and the outer spherical surface of 16. The joint is the invention of Charles E. Godley.

At the other end of the link there is provided a universal joint of identical construction connecting it to bracket 38, carrying spherical boss 40. The bracket is provided with hook-shaped supports 42 supporting one edge of the mirror in such manner as to permit tilting movement. Obviously, if desired, the mirror could be provided with a frame, and the tiltable mounting could be accomplished by pivoting the frame to the bracket 38, but we prefer the simple arrangement shown. The bracket 38 is provided with an arcuate recess 44 of greater depth at its ends 46 than at the central portion. Bracket 38 is provided with a central aperture 48. A clip 50 provided with hook-shaped arms 52 engaging over the upper edge of the mirror is provided with a rearwardly extending arm 54 having an upwardly bent enlarged end or lug 56. The lug 56 may pass through the aperture 48 when turned 90° from the position shown in Figure 3, and after it has passed through the aperture may be turned back to its original position so that the ends of the part 56 engage the rear of the plate 38 and act as a stop. The part 54 is provided with a slot 58 to receive tongue 60 on sleeve 62, through which passes the helical spring 65 housed within the recess 44, and having its ends secured to the bracket 38 by any suitable means, such as the pressed out tongues 64.

With the described construction it will be noted that the spring 65 at all times exerts a downward pull on the sleeve 62 and clip 50 yieldingly holding the mirror 10 in the supports 42.

The sleeve 62 has rocking engagement with the member 54, and is so located with respect to the line of pull of spring 65 that it has a dead center position between the full and dotted line positions shown in Figure 2. In this dead center position the fulcrum of the member 62 on the member 54 is in the plane of pull of the spring 65. In any other position the spring 65 either holds the mirror and clip 50 against the bracket 38 or holds the tongue 56 against the rear face of the bracket. The spring 65 thus functions both to hold the mirror 10 in the supports 42, and to hold the mirror in either of its tilted positions.

With the driver seated in the car it is now obvious that the first thing he will do will be to move the mirror into position to give him a view of the roadway in the rear. The frictional universal joints at the ends of the link 18 permit this adjustment to an extent not possible heretofore. With the mirror thus adjusted the operator may, by simply grasping the top of the mirror, readily tilt it to either day or night driving position. The frictional resistance offered by the springs 32 prevents the tilting of the mirror from affecting the adjustment at the universal joints.

In Figure 6 we have shown a modification in which the link 18 is replaced by supporting arm 70 adapted to be bolted to a suitable support. To the lower end of the arm is secured by the universal mounting, previously described, a bracket 72 similar to the bracket 38 except that it has an aperture 74 elongated in a vertical direction but of smaller size than the aperture 48. Through the aperture 74 is passed a cam 76 riveted to clip 78 as shown. A helical spring 65 housed in the arcuate recess 44 is looped over the member 76. The member 76 is provided with a central enlargement 80 which may be produced by forming opposed conical surfaces on the member 76. In the end of the member 76 is secured bolt 82 which acts as a stop by abutment against the rear of the bracket 72, and limits the forward tilting of the mirror. The spring 65 holds the mirror in the support 72 and, by snapping into place on either side of the enlargement 80, holds the mirror in either of its adjusted positions.

In Figures 7, 8 and 9, we have shown a further modification. Here the bracket 84 is provided with rearwardly extending arc-shaped arms 86 slotted to receive a bolt 88 having a spacing sleeve 90 thereon. The bolt may be supported from a suitable bracket such as shown at 92, or, if desired, by the conventional bracket now in use having forwardly extending arms overlying the arms 86 on the bracket 84. This mounting permits adjustment of the mirror about horizontal and vertical axes. Bracket 84 is provided with seats 94 in which the mirror 10 is tiltably mounted, and at its upper end carries forwardly and downwardly bent stops 96 which engage the upper edge of the mirror, and limit its tilting movement. Clip 98 engages the upper edge of the mirror. It is provided at its lower end with sleeve 100 in which is journalled a spring pintle 102 having offset arms 104 received within sleeves 106 formed on the bracket 84. A stop screw 108 is threaded in the bracket 84 in position to engage the clip 98, and limit its rearward movement.

The spring pintle 102 is normally stressed so as to yieldingly urge the clip 98 against the glass, thereby holding the mirror in the seats 94. The spring action of the member 102 likewise holds the mirror in either of its adjusted positions. Referring now to Figure 7, it will be noted that the spring pintle 102 is stressed the most when the axes of the pivots 100 and 106 are in line with the fulcrum of the mirror. Consequently, when the spring 102 is in either the full or the dotted line positions shown in Figure 7, it tends to hold the pivot 100 on whichever side of dead center position it may be.

In Figure 10 we have shown a further modification. Here the bracket 108 receives the mirror 10 as before. The clip 110 is adjustably mounted on the bracket 108, the adjustment consisting of a set screw 112 arranged as shown. The clip 110 may be formed of spring material, and has a plurality of seats 114 formed in the portion thereof that overlies the mirror. The forward end of the clip 110 is bent downwardly at 116, and receives the adjusting screw 118 that limits the forward tilting movement of the mirror. Obviously the mirror may be tilted to either position desired, and in either position the clip 110 not only holds the mirror in the bracket 108, but also yieldingly holds it in either of its adjusted positions.

Our improved mirror mounting is obviously capable of use in many different relations, and the references in the claims to "horizontal," "vertical" and the like, are to be understood as used in a relative sense only.

The bracket supporting the mirror may obviously be of any desired shape, may be equipped with a link as shown in Figure 2, if desired and may provide a tiltable mounting for the mirror in any way that may be most convenient. The mirror may, of course, be provided with a protecting edge of any desired material.

Many modifications of the mounting will be apparent upon careful study of the principles underlying this invention.

We claim:

1. In a rear vision mirror the combination of a support, a bracket, a connection between the support and bracket permitting adjustment of the bracket about a vertical axis, a mirror, means for mounting the mirror on the bracket for rocking adjustment about a horizontal axis, said mirror having surfaces of different reflecting power arranged to be brought into the line of vision upon predetermined acute angular adjustment thereof, and means for limiting the rocking movement of said mirror to said predetermined angle.

2. In a rear vision mirror the combination of a support, a bracket, a connection between the support and bracket permitting adjustment of the bracket about horizontal and vertical axes, a mirror, means for mounting the mirror on the bracket for rocking adjustment about a horizontal axis, said mirror having surfaces of different reflecting power arranged to be brought into the line of vision upon predetermined acute angular adjustment thereof, and means for limiting the rocking movement of said mirror to said predetermined angle.

3. In a rear vision mirror, the combination of a support, a bracket, a universal joint connecting the support and bracket, a mirror, means for mounting the mirror on the bracket for rocking adjustment about a horizontal axis, said mirror having surfaces of different reflecting power arranged to be brought into the line of vision upon predetermined acute angular adjustment thereof, and means for limiting the rocking movement of said mirror to said predetermined angle.

4. In a rear vision mirror, the combination of a support, a bracket, a universal joint connecting the support and bracket, means for frictionally holding said joint in adjusted position, a mirror, and means for mounting the mirror on the bracket for rocking adjustment about a horizontal axis, said mirror having surfaces of different reflecting power arranged to be brought into the line of vision upon predetermined acute angular adjustment thereof, and means for limiting the rocking movement of said mirror to said predetermined angle.

5. In a rear vision mirror, the combination of a bracket provided with a seat for receiving one edge of a rear vision mirror, a mirror tiltably mounted in said seat, and means engaging the mirror at a point spaced from the seat for limiting the tilting movement of the mirror to a predetermined acute angle.

6. In a rear vision mirror, the combination of a bracket provided with a seat for receiving one edge of a rear vision mirror, a mirror tiltably mounted in said seat, and means engaging the mirror at a point spaced from the seat for limiting the tilting movement of the mirror to a predetermined acute angle, means associated with the last named means for yieldingly holding the mirror in engagement with the seat.

7. In a rear vision mirror, the combination of a bracket provided with a seat for receiving one edge of a rear vision mirror, a mirror tiltably mounted in said seat, and means engaging the mirror at a point spaced from the seat for limiting the tilting movement of the mirror to a predetermined acute angle, and means for yieldingly holding the mirror in either of its limiting positions.

8. In a rear vision mirror, the combination of a bracket provided with a seat for receiving one edge of a rear vision mirror, a mirror tiltably mounted in said seat, and means engaging the mirror at a point spaced from the seat for limiting the tilting movement of the mirror to a predetermined acute angle, means associated with the last named means for yieldingly holding the mirror in engagement with the seat, and means for yieldingly holding the mirror in either of its limiting positions.

9. In a rear vision mirror, the combination of a bracket provided with a seat for receiving one edge of a rear vision mirror, a mirror tiltably mounted in said seat, and means engaging the mirror at a point spaced from the seat for limiting the tilting movement of the mirror to a predetermined acute angle, and means for yieldingly holding the mirror in either of its limiting positions, said last named means including a pivoted member having a dead center position between said limiting positions.

10. In a rear vision mirror, the combination of a bracket provided with a seat for receiving one edge of a rear vision mirror, a mirror tiltably mounted in said seat means engaging an edge of the mirror opposite the seat, and spring means connected to the bracket and said last-named means and yieldingly urging the latter into engaging position.

11. In a rear vision mirror, the combination of a bracket provided with a seat for receiving one edge of a rear vision mirror, a mirror tiltably mounted in said seat, means engaging an edge of the mirror opposite the seat, spring means connected to the bracket and said last named means and yieldingly urging the latter into engaging position, and means associated with said spring means for causing the latter to hold the mirror in either of two tilted positions.

12. In a rear vision mirror, the combination of a bracket provided with a seat for receiving one edge of a rear vision mirror, a mirror tiltably mounted in said seat, a clip connected to the mirror opposite the seat, a stop connected with said clip adapted to engage the bracket and limit forward tilting movement of the mirror, and a spring pressed dead center device connecting the clip and bracket and adapted to yieldingly hold the mirror in either forward or rearward position and to yieldingly hold the clip in engagement with the mirror.

13. In a rear vision mirror, the combination of a bracket provided with a seat for receiving one edge of a rear vision mirror, a mirror tiltably mounted in said seat, a clip engaging an edge of the mirror opposite the seat, a stop extending from said bracket adapted to engage the mirror and limit its forward tilting and a spring pressed dead center device connecting the clip and bracket and adapted to yieldingly hold the mirror in either forward or rearward position and to yieldingly hold the clip in engagement with the mirror.

14. In a rear vision mirror, the combination of a bracket provided with a seat for receiving one edge of a rear vision mirror, a mirror tiltably mounted in said seat, means connecting the mirror and bracket adapted to hold the mirror in the seat in any of its tilted positions, a support, and means adjustably connecting the bracket and support whereby the mirror and bracket may be adjusted to any desired position and in such position the mirror may be tilted.

15. In a rear vision mirror the combination of a bracket, a mirror pivotally mounted on said bracket, means engaging an edge of the mirror opposite the pivotal connection, a spiral spring having its ends connected to the bracket, and connected to said means between its ends, said spring being under stress to hold said means in engagement with the mirror.

16. In a rear vision mirror, the combination of a bracket, a mirror pivotally mounted on said bracket, means engaging an edge of the mirror opposite the pivotal connection, a spiral spring having its ends connected to the bracket, a link pivoted to said means and engaging said spring between its ends, said spring being under stress to hold said link in engagement with said means and said link having a dead center position between extreme tilted positions of said mirror.

In testimony whereof we affix our signatures.

ROBERT N. FALGE.
CHARLES E. GODLEY.